June 5, 1951  P. M. FIELD  2,555,402
OPTICAL INDICATOR MEANS FOR USE WITH COPY
PROJECTION APPARATUS
Filed Oct. 17, 1950  2 Sheets-Sheet 1
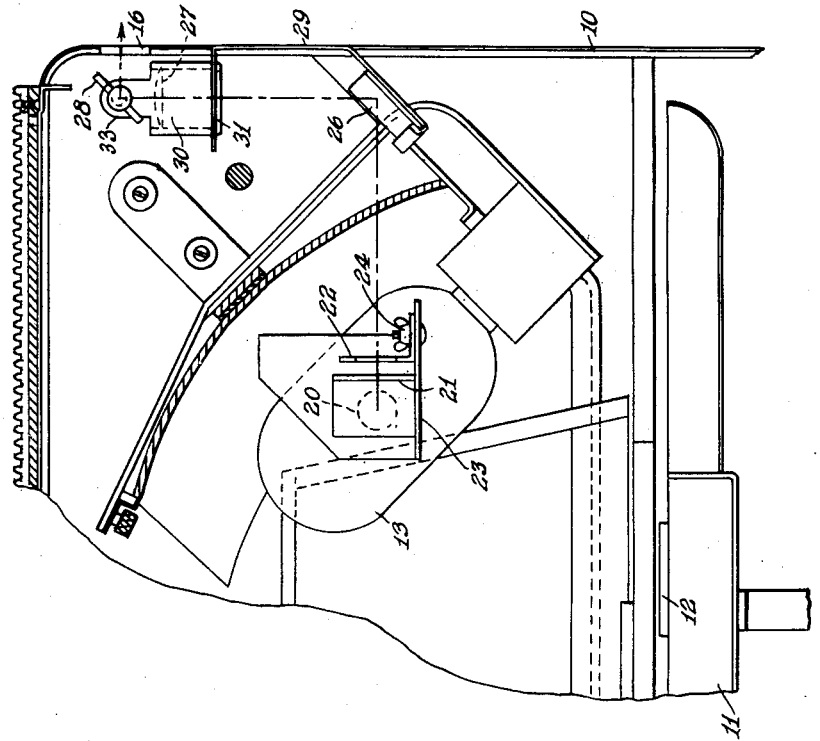
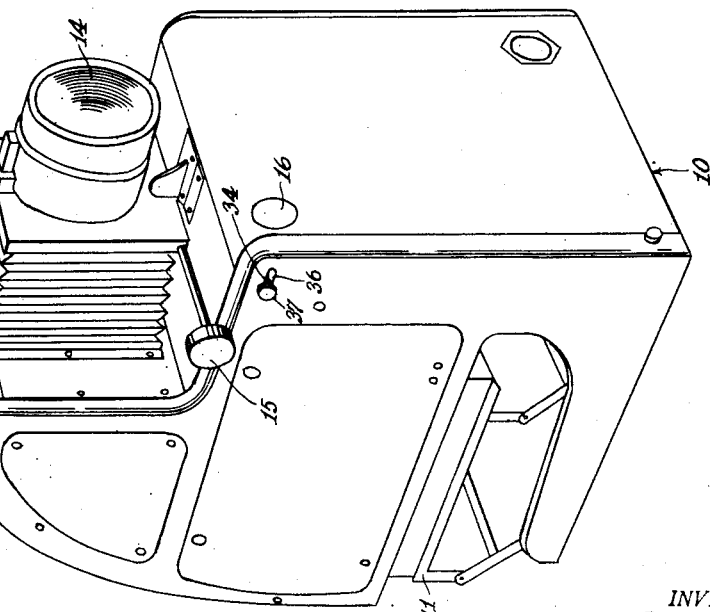
INVENTOR.
PHILIP M. FIELD
BY
*Fred'k T. Dehnert*
ATTORNEY June 5, 1951　　　　　P. M. FIELD　　　　　2,555,402
OPTICAL INDICATOR MEANS FOR USE WITH COPY
PROJECTION APPARATUS
Filed Oct. 17, 1950　　　　　　　　　　2 Sheets-Sheet 2
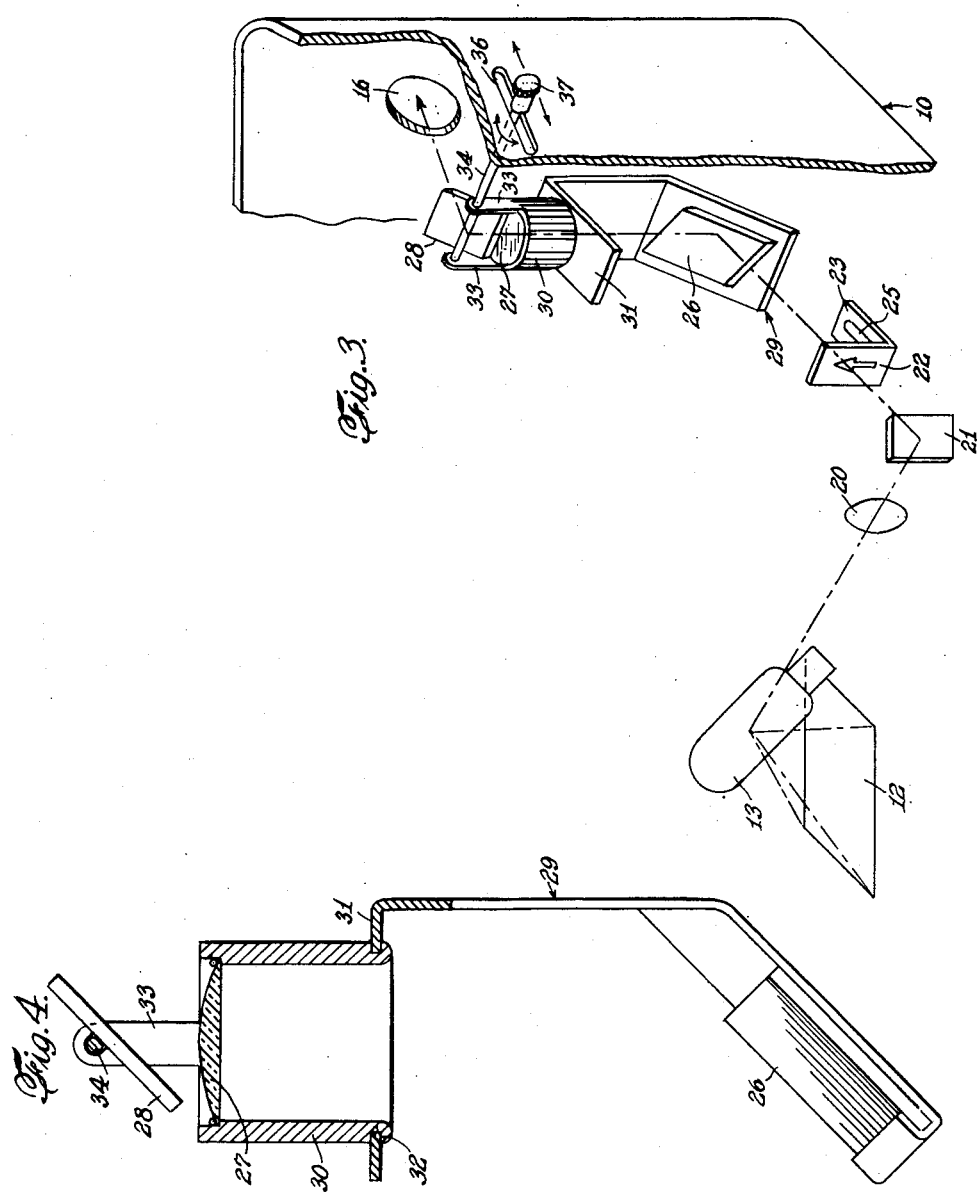
INVENTOR.
PHILIP M. FIELD
BY
Fred'k F. Schuetz
ATTORNEY.

Patented June 5, 1951

2,555,402

UNITED STATES PATENT OFFICE 2,555,402

OPTICAL INDICATOR MEANS FOR USE WITH COPY PROJECTION APPARATUS

Philip M. Field, New York, N. Y., assignor to Charles Beseler Company, Newark, N. J., a partnership Application October 17, 1950, Serial No. 190,583

7 Claims. (Cl. 88—24)

1

The invention relates to projector apparatus designed more especially for the projection upon a suitable screen of opaque copy, such as photographs, post cards, pages of a book or magazine, as well as three-dimensional objects.

It has for an object to provide, in connection with the projected image of the copy upon the screen, an image pointer also on the screen, the latter image being readily controllable manually for location or superimposition on the projected copy at any part of the same as may be desired.

A further object is to provide readily accessible controlling means externally of the projector housing, such as a knob, by means of which the pointer image may be shifted over the screen to the desired location merely by operating the said controlling means in two degrees of freedom. By this expedient, any detail of the projected copy material may be pointed out by the operator of the projector without requiring him to move away from the same.

In carrying out the invention, there is provided a first projector having a suitable source of illumination located within the projector housing; and a second projector is associated optically therewith, the same including a member, having a pointed or other suitably shaped aperture affording the desired pointer design, which has access optically to the interior of the projector housing for the illumination of its aperture, this being effected preferably from a portion of the stray light from the said first projector source of illumination. This stray light passing through the indicator design is picked up by a projection lens having associated therewith a pivoted reflecting means for the image formed, for example means such as a mirror operable by controlling means whereby to direct said image toward the screen area and over the entire copy image projected thereon by the first projector.

The nature of the invention, however, will best be understood when described in connection with the accompanying drawings, in which:

Fig. 1 is a view, in perspective, of projector apparatus for opaque copy and equipped with the novel optical indicator means.

Fig. 2 is a fragmentary longitudinal section of the projector apparatus, on an enlarged scale, illustrating the optical indicator means installed.

Fig. 3 is a schematic showing of the optical system for affording an indicator on a screen and the actuating means thereof.

Fig. 4 is a fragmentary vertical section, on an enlarged scale, of a portion of the optical system and illustrates the manner of mounting for rotation the projection lens unit and indicator-directing mirror.

Referring to the drawings, 10 designates the housing of an opaque copy projector apparatus embodying generally a support member 11 for copy 12, the lamp 13 for illumination of the copy, and the projecting lens 14, with extensible bellows controllable by a manually operable knob 15 in projecting the copy upon a screen (not shown).

In connection with such projection and in accordance with the invention, there is provided means to superimpose on the projected copy image an indicator image the position of which is manually controllable with respect to the said projected copy image. This indicator is arranged, as is hereinafter more fully set forth, to be projected through an opening 16 in the front wall of the housing 10. In effecting projection of the indicator image, a suitable source of light, which may be independent of the lamp 13, is provided; but it is preferred to utilize, generally, a portion of the stray light emitted by lamp 13 which is gathered by a condenser lens 20.

A mirror 21 in the optical axis of this lens directs the light then through the opening of an apertured member 22, said opening affording the desired design of image for superimposition, for example, that of an arrow as shown. The member 22 as well as mirror 21 and condenser lens 20 may be mounted on a common bracket 23 secured to the housing, the said apertured member 22 being adjustable along the bracket in the optical axis of the condenser lens 20, as by means of an attaching thumbscrew bolt 24 passing through the bracket slot 25, for the purpose of focussing an image of the aperture of member 22 upon the screen. The design thus provided by member 22 is reflected upwardly by a further mirror 26 to pass through a projecting lens 27 therefor, the image being then reflected by an angularly adjustable or pivoted mirror 28 outwardly through the opening 16 to the screen.

The mirrors 26 and 28 as well as the lens 27 of the lens unit are conveniently carried by a further bracket member 29 secured to the housing, and the barrel 30 of the lens unit is preferably rotatably mounted on the top arm 31 of said bracket member 29. This may be effected, for example, by shouldering the bottom of said barrel over the perimeter of an opening 32 of the said arm 31, the bottom edge of the barrel being turned over outwardly under the bracket arm, as is shown more particularly in Fig. 4 of the drawings, to lock the barrel rotatably thereto.

As hereinbefore noted, the image of the arrow design reflected through opening 16 is to be adjustable over the screen both about a vertical axis and a horizontal axis. The former adjustment is secured by rotating barrel 30 about the optical axis of lens 27, and the mirror 28 then being carried by the barrel which remains otherwise fixed in the optical system. To this end, the said barrel is provided with ears 33 which extend upwardly from the top of said lens barrel to afford bearings for an operating rod 34 carrying the mirror 28 between said ears, the said rod projecting through a horizontal slot 36 in the housing wall.

A knurled knob 37 at the outer end of the rod affords a means for rotating manually the said rod and with it the mirror 28 to swing the image of an arrow up and down the screen, while by shifting the rod laterally the barrel 30 with mirror 28 is rotated about a vertical axis to swing the said image transversely of the screen. The image may thus be located in the desired position with respect to copy projected upon the screen by lens 14, both operations being performed simultaneously, thus expediting the desired superimposition of the indication on the projected copy.

I claim:

1. The combination with a first projector for projecting copy and including a housing, a copy illuminating system and a lens for projecting an image of said copy upon a viewing screen; of a second projector optically associated with the first projector and comprising an apertured indicator member providing a design for projection and having optical access to the interior of the housing for illumination of the design, means for directing an image of the illuminated design upon the screen area of the first projector, and manually operable means, accessible externally of the housing and having two degrees of freedom of motion, for actuating the image directing means whereby the projected design image may be deflected respectively in a horizontal plane and in a vertical plane across the screen area over the entire copy image projected thereon by the first projector.

2. The copy projector combination according to claim 1, wherein a condenser lens is directed toward the copy illuminating system to gather stray light therefrom for the illumination of the apertured indicator member.

3. The copy projector combination according to claim 1, wherein the design image directing means is a mirror adapted to receive rays of the illuminated design, and means are provided for mounting the mirror for angular movement with two degrees of freedom.

4. The combination with a first projector for projecting copy and including a housing, a copy illuminating system and a first lens for projecting an image of said copy upon a viewing screen; of a second projector located within the housing and comprising an apertured indicator member mounted within the housing and including means for illuminating the indicator member; a second projector lens to project an image of said indicator member aperture through an opening in the housing and upon the screen area of the copy projector; an adjustable mirror within the housing positioned between the second projector lens and the opening for reflecting the image projected by said second lens through said opening and upon the screen and superimposing said image upon projected copy; and manually operable means extending externally of the housing for moving said mirror about a vertical axis and about a horizontal axis to position the projected design image across the screen as well as up and down the same over the entire copy image projected thereon by the first projector.

5. The copy projector combination according to claim 4, wherein an operating rod is provided to extend outwardly from the adjustable mirror through a horizontal slot of the projector housing and is provided at its outer end exteriorly of said housing with a knob whereby to rock manually the said adjustable mirror about its horizontal axis, and the said rod having also a limited lateral movement to impart to the adjustable mirror the said angular movement about a vertical axis.

6. The copy projector combination according to claim 5, having means for mounting the second projector lens for rotation about its optical axis, and means for supporting the adjustable mirror on the mounting means to move therewith.

7. The copy projector combination according to claim 6, wherein the second projector lens is mounted in a lens barrel having oppositely disposed bearing members extending from an end thereof parallel to the optical axis of the lens, said bearing members affording bearings for an operating rod supporting the adjustable mirror.

PHILIP M. FIELD.

REFERENCES CITED

The following references are of record in the file of this patent:

UNITED STATES PATENTS

| Number | Name | Date |
| --- | --- | --- |
| 996,647 | Jacobson | July 4, 1911 |
| 1,009,897 | Dexter et al. | Nov. 28, 1911 |
| 1,036,131 | Mayer | Aug. 20, 1912 |
| 1,081,922 | Balderson | Dec. 16, 1913 |
| 1,134,154 | Patterson | Apr. 6, 1915 |
| 1,224,663 | Patterson | May 1, 1917 |
| 1,704,811 | Stuber | Mar. 12, 1929 |
| 1,738,942 | Brekert et al. | Dec. 10, 1929 |
| 1,919,922 | Baker et al. | July 25, 1933 |
| 2,357,542 | Pfeil | Sept. 5, 1944 |
| 2,463,026 | Field | Mar. 1, 1949 |